(12) United States Patent
Song et al.

(10) Patent No.: US 9,128,735 B2
(45) Date of Patent: Sep. 8, 2015

(54) METHOD FOR UPDATING MEDIA DATABASE IN PORTABLE TERMINAL

(75) Inventors: Ji-Hwon Song, Suwon-si (KR); Jin-Chun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 13/286,436

(22) Filed: Nov. 1, 2011

(65) Prior Publication Data
US 2012/0117024 A1 May 10, 2012

(30) Foreign Application Priority Data

Nov. 8, 2010 (KR) ........................ 10-2010-0110679

(51) Int. Cl.
*G06F 17/30* (2006.01)
*G06F 9/44* (2006.01)

(52) U.S. Cl.
CPC .......... *G06F 9/4448* (2013.01); *G06F 17/3002* (2013.01); *G06F 17/30141* (2013.01)

(58) Field of Classification Search
None
See application file for complete search history.

(56) References Cited

U.S. PATENT DOCUMENTS

| 2005/0046635 | A1 | 3/2005 | Honme |
| 2007/0015538 | A1 | 1/2007 | Wang |
| 2008/0320139 | A1* | 12/2008 | Fukuda et al. ................ 709/226 |

FOREIGN PATENT DOCUMENTS

| CN | 1617575 A | 5/2005 |
| EP | 1 675 018 A2 | 6/2006 |
| JP | 2007-189394 A | 7/2007 |
| JP | 2008-172767 A | 7/2008 |

OTHER PUBLICATIONS

ApplicationsProvider 2009, yongbok.net [Accessed on Mar. 23, 2013], http://android.yongbok.net/repository/packages/providers/ApplicationsProvider/src/com/android/providers/applications/ApplicationsProvider.java.*
aby et al., Get current locale Jun. 15, 2009 [Accessed on Mar. 22, 2013], groups.google.com, https://groups.google.com/forum/?fromgroups=#!topic/android-developers/Qfh-miyIbWM.*
Locale | Android Developers [Archive.org capture date Apr. 14, 2009], android.com, http://web.archive.org/web/20090414064040/http://developer.android.com/reference/java/util/Locale.html.*
MediaScannerConnection | Android Developers [Archive.org capture date Apr. 16, 2009], android.com, http://developer.android.com/reference/android/media/MediaScannerConnection.html.*
va, need for ACTION_LOCALE_CHANGED intent? Apr. 20, 2009, mail-archive.com, http://www.mail-archive.com/android-framework@googlegroups.com/msg02342.html.*
Intent | Android Developer [Archive.org capture date Oct. 23, 2009], android.com, http://web.archive.org/web/20091023050526/http://developer.android.com/intl/zh-CN/reference/android/content/Intent.html.*

(Continued)

*Primary Examiner* — Jason Liao
(74) *Attorney, Agent, or Firm* — Jefferson IP Law, LLP

(57) ABSTRACT

A method for updating a media database in a portable terminal is provided. The method includes, when a change in a locale of the portable terminal is detected, decoding metadata of one or more media files according to a coding scheme corresponding to the changed locale, and updating the media database based on the decoded metadata.

6 Claims, 4 Drawing Sheets

```
private BroadcastReceiver mLocaleChangeReceiver = new BroadcastReceiver() {
    public void onReceive(Context context, Intent intent)  {
        String action = intent.getAction();

if (Intent.ACTION_LOCALE_CHANGED.equals(action))  {
            Log.d(TAG, "received Intent.ACTION_LOCALE_CHANGED > set locale");

// 1. get Database
410         DatabaseHelper database = null;

synchronized (mDatabases) {
                database = mDatabases.get(EXTERNAL_VOLUME);
            }

// 2. Set Locale
            if( database != null )  {
420             SQLiteDatabase db = database.getWritableDatabase();

try  {
                    db.setLocale(Locale.getDefault());
                } catch (RuntimeException e)  {
                    Log.e(TAG, "Failed to setLocale()", e);
                }

// need to rescan audio files to remake key value, because collator is changed.
                db.execSQL("UPDATE audio_meta SET date_modified=0;");
            }

// start MediaScanner to rescanning audio files.
430         Bundle args = new Bundle();
            args.putString("volume", MediaProvider.EXTERNAL_VOLUME);
            context.startService(new Intent(context, MediaScannerService.class).putExtras(args));
        }
    }
};
```

(56) References Cited

OTHER PUBLICATIONS

Creating an Input Method date unknown [Accessed on Mar. 22, 2013], android.com, http://developer.android.com/guide/topics/text/creating-input-method.html.*

Yuan Song, 小肥有话说 Jul. 28, 2009, yuan.se, http://www.yuan.se/?p=60.*

Intent | Android Developer [Archive.org capture date Aug. 31, 2009], android.com, http://web.archive.org/web/20090831060929/http://developer.android.com/intl/zh-CN/reference/android/content/Intent.html.*

MediaStore | Android Developer [Archive.org capture Date Aug. 31, 2009], android.com, http://web.archive.org/web/20090831055217/http://developer.android.com/intl/zh-CN/reference/android/provider/MediaStore.html.*

Howe, metadata from FOLDOC May 15, 2010, Free On-Line Dictionary of Computing, http://foldoc.org/metadata.* deVadoss, Metadata-Driven User Interfaces Jul. 2005, Microsoft.com, http://msdn.microsoft.com/en-us/library/ms954610.aspx.* metadata UI—Google Search Jul. 9, 2013, google.com, http://google.com, http://www.google.com/#sclient=psy-ab&q=metadata+UI&oq=metadata+UI&gs_I=hp.3..0I2j0i22i30I2.853.2676.0.3036.11.11.0.0.0.0.475.2250.2j5j2j0j2.11.0....0...1c.1.19.psy-ab.gryLWiCKKSk&pbx=1&bav=on.2,or.r_qf&bvm=bv.48705608,d.dmg&fp=eaa8dcb9a92423ce&biw=840&bih=1057.*

Kuisma, Integrating GNU/Linux with Android the Matrix Way Sep. 13, 2010, ping.se, http://whiteboard.ping.se/uploads/Android/sftp-android.png.*

Vogel, Android Development—Tutorial Jan. 14, 2010, vogella.com, http://www.vogella.com/tutorials/Android/images/xfileexplorer10.png.pagespeed.ic.LLGfdd_Roq.png.*

* cited by examiner

| Capsule | | |
|---|---|---|
| 1 | 궈?긯긎깐긪긂긎 | 320a |
| 2 | 빏앮 | 330a |
| 3 | 쀛겅됏 | 340a |

310 points to header row.

| Capsule | | |
|---|---|---|
| 1 | サムライロジック | 320b |
| 2 | 粉雪 | 330b |
| 3 | コノ花 | 340b |

```
private BroadcastReceiver mLocaleChangeReceiver = new BroadcastReceiver() {
    public void onReceive(Context context, Intent intent)   {
        String action = intent.getAction();

if (Intent.ACTION_LOCALE_CHANGED.equals(action))   {
            Log.d(TAG, "received Intent.ACTION_LOCALE_CHANGED > set locale");

// 1. get Database
410         DatabaseHelper database = null;

synchronized (mDatabases) {
                database = mDatabases.get(EXTERNAL_VOLUME);
            }

// 2. Set Locale
            if( database != null )   {
                SQLiteDatabase db = database.getWritableDatabase();

try   {
                    db.setLocale(Locale.getDefault());
420             } catch (RuntimeException e)   {
                    Log.e(TAG, "Failed to setLocale()", e);
                }

// need to rescan audio files to remake key value, because collator is changed.
                db.execSQL("UPDATE audio_meta SET date_modified=0;");
            }

// start MediaScanner to rescanning audio files.
            Bundle args = new Bundle();
430         args.putString("volume", MediaProvider.EXTERNAL_VOLUME);
            context.startService(new Intent(context, MediaScannerService.class).putExtras(args));
        }
    };
};
```

FIG.4

METHOD FOR UPDATING MEDIA DATABASE IN PORTABLE TERMINAL

PRIORITY

This application claims the benefit under 35 U.S.C. §119(a) of a Korean patent application filed in the Korean Intellectual Property Office on Nov. 8, 2010 and assigned Serial No. 10-2010-0110679, the entire disclosure of which is hereby incorporated by reference.

BACKGROUND OF THE INVENTION

1. Field of the Invention

The present invention relates to a portable terminal. More particularly, the present invention relates to a method for updating a media database in a portable terminal based on an Android Operating System (OS).

2. Description of the Related Art

Generally, a portable terminal refers to an electronic apparatus which performs communication and exchanges data while moving. With the diversification and development of mobile communication environments, the portable terminal is now expanding to fields other than voice communication.

Recent portable terminals, often called smart phones, provide various functions, which have not been provided in general portable phones (e.g., feature phones). Smart phones may be classified into portable terminals of iPhone series using Apple iOS® and portable terminals using Google Android® according to the Operating Systems (OSs) they use. The Android OS is an open platform provided by Google and the Open Handset Alliance (OHA). Adoption of the Android OS as a smart phone OS is increasing.

The Android smart phone generates and updates a media database for media files accessible by the portable terminal (e.g., stored in the portable terminal or in an external medium removable from the portable terminal), and a user may check predetermined media data from the media database to request use of the media data. For example, in the Android smart phone, media scanning is performed when metadata of media data is changed or media data is newly added or removed, and through media scanning, the media database may be generated or updated.

Updating the media database after generating the media database in the Android smart phone is referred to as media scanning Media scanning is performed by decoding metadata of media data accessible in a locale set in the Android smart phone at the time of the scanning (generation and updating of the database). For example, if media scanning is performed when the locale of the Android smart phone is set to English, media scanning (establishment and updating of the media database) is performed by decoding metadata of the media data according to a decoding scheme based on English.

Since the Android smart phone supports many languages and is used in various countries, the locale of the Android smart phone may be freely changed according to a user's request. However, in case of media scanning in the Android smart phone, when the user uses a media database after changing the locale, information about predetermined media data included in the media database may not be displayed normally. This is because media scanning in the Android smart phone is performed by decoding metadata of media data based on the local set at the time of media scanning.

For example, on the assumption that media scanning is performed for the locale set to English, and then media scanning is performed again due to addition of media data, and metadata of the added media data has been encoded in a third language (e.g., Japanese) other than English, even if the user changes the locale into the third language, media scanning in the Android smart phone is performed by decoding the metadata of the media data encoded in the third language other than English, such that when a media database updated by media scanning may display information of the added media data, the information may be distorted or may be displayed as unidentifiable characters.

Accordingly, there is a need to normally display information of media data through a media database by performing media scanning on the media data correspondingly if a locale setting of a portable terminal (e.g., an Android smart phone) is changed.

SUMMARY OF THE INVENTION

Aspects of the present invention are to address at least the above-mentioned problems and/or disadvantages and to provide at least the advantages described below. Accordingly, an aspect of the present invention is to normally display information of media data through a media database by performing media scanning on the media data correspondingly if a locale setting of a portable terminal is changed.

Another aspect of the present invention is to provide improved utility of a popular smart phone driven by the Android OS (or an Android smart phone) by providing a method for updating a media database.

According to an aspect of the present invention, a method for updating a media database in a portable terminal is provided. The method includes, when a change in a locale of the portable terminal is detected, decoding metadata of one or more media files according to a coding scheme corresponding to the changed locale, and updating the media database based on the decoded metadata.

According to another aspect of the present invention, a portable terminal is provided. The portable terminal includes a storage unit having a media database, and a controller for, when a change in a locale of the portable terminal is detected, decoding metadata of one or more media files according to a coding scheme corresponding to the changed locale, and for updating the media database based on the decoded metadata.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A and 3B are exemplary diagrams for describing a process of updating a media database according to an exemplary embodiment of the present invention FIG. 4 shows a source code of a Broadcast Receiver for updating a media data base according to an exemplary embodiment of the present invention.

DETAILED DESCRIPTION OF EXEMPLARY EMBODIMENTS

The following description with reference to the accompanying drawings is provided to assist in a comprehensive understanding of exemplary embodiment of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portable terminal according to an exemplary embodiment of the present invention is a mobile electronic apparatus which is easy to carry, examples of which may include a video phone, a general portable phone (e.g., a feature phone), a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) device, a small-size desktop computer, a notebook, or the like.

Figure 5:
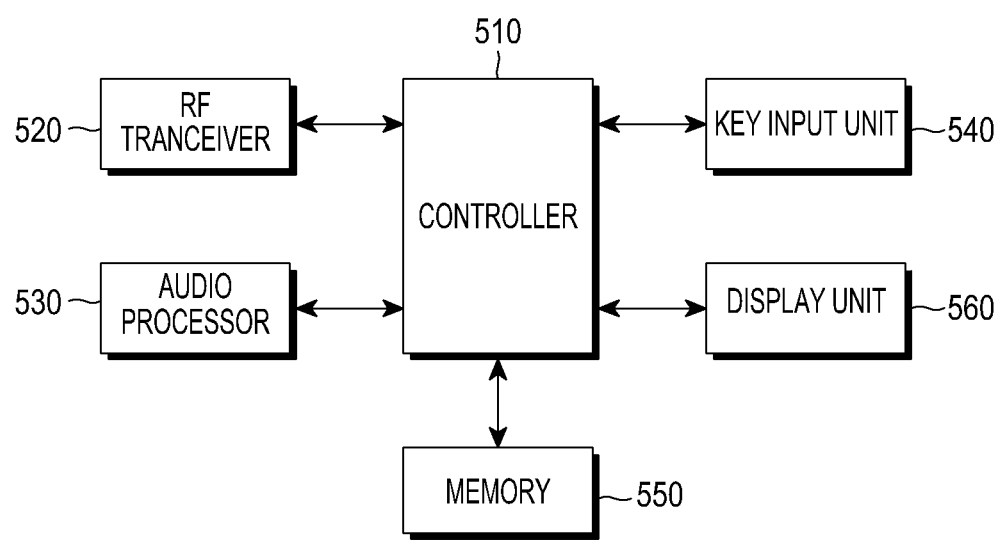
FIG. 5 shows a portable terminal according to an exemplary embodiment of the present invention.

FIG. 5 shows a portable terminal according to an exemplary embodiment of the present invention. Referring to FIG. 5, the portable terminal is assumed to be an Android smart phone operating according to an Android OS, and may include a controller 510, a Radio Frequency (RF) transceiver 520, an audio processor 530, a key input unit 540, a memory, a display unit 560, and the like.

The controller controls the overall operation of the portable terminal, and may control an operation of the portable terminal according to a user's input made through the key input unit and the display unit.

The RF transceiver may include an RF unit and a modem. The RF unit includes an RF transmitter for up-converting a frequency of a transmission signal and amplifying the up-converted transmission signal and an RF receiver for low-noise-amplifying a received signal and down-converting a frequency of the low-noise-amplified signal. The modem includes a transmitter for encoding and modulating the transmission signal and a receiver for demodulating and decoding the received signal.

The audio processor may include a codec including a data codec and an audio codec. The data codec processes packet data and the audio codec processes audio signals like voice and a multimedia file. The audio processor 25 also converts a digital audio signal received from the modem into an analog audio signal through the audio codec and reproduces the analog audio signal, or converts an analog audio signal generated from a microphone (MIC) into a digital audio signal through the audio codec and transmits the digital audio signal to the modem. The codec may be separately provided or may be included in the controller.

The key input unit may include keys for inputting numeric and character information and function keys for setting various functions. The key input unit, by including a touch sensor, may receive a key input through a user's touch.

The memory may include program and data memories which store programs for controlling a general operation of the portable terminal. The memory may include an external memory such as a Compact Flash (CF), a Secure Digital (SD), a Micro Secure Digital (Micro-SD), a Mini-SD, an Extreme Digital (xD), a memory stick, or the like.

The display unit outputs various display information generated in the portable terminal, and may include a Liquid Crystal Display (LCD) or a Passive Matrix Organic Light Emitting Diode (PMOLED) or Active Matrix OLED (AMOLED) as an OLED. The display unit may include a touch screen to operate as an input unit for controlling the portable terminal, together with the key input unit.

The portable terminal may include additional devices and applications which can be included in the portable terminal, such as a Global Positioning System (GPS) module, a camera module, a Bluetooth module, a WiFi module, an acceleration sensor, a proximity sensor, a gyroscope, a DMB receiver, and the like.

For example, the acceleration sensor may be used to sense a motion state of the portable terminal by measuring a dynamic force such as acceleration, vibration, shock, or the like, and sense a display direction of the display unit of the portable terminal through the sensed motion state. The proximity sensor may be used to sense the proximity of a part of a user's body to the portable terminal, thereby preventing malfunction of the portable terminal which provides the touch screen function. The gyroscope observes dynamic motion of the rotating portable terminal and may be used to sense rotating motion along 6 axes of the portable terminal, that is, up or down, left or right, forward or backward, an X axis, a Y axis, and a Z axis, in association with the acceleration sensor.

Figure 1:
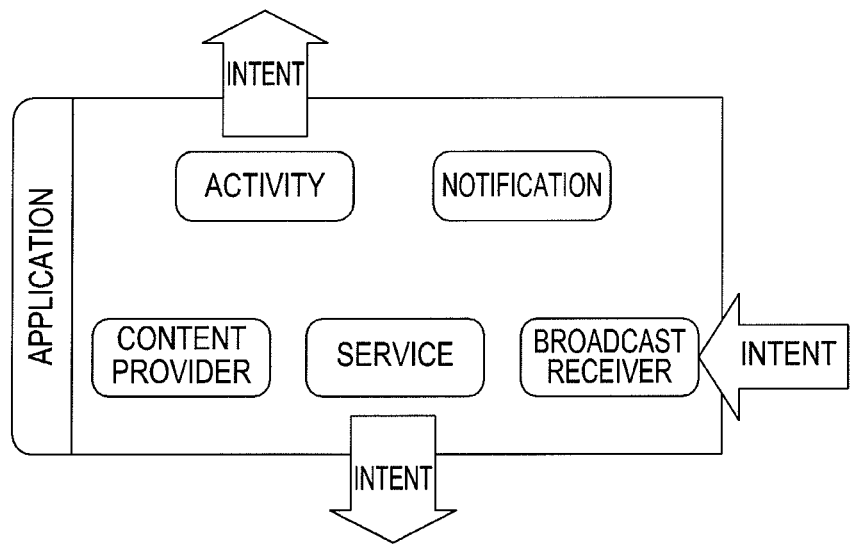
FIG. 1 is a schematic block diagram of components related to configuration of an application in an Android platform according to an exemplary embodiment of the present invention.

FIG. 1 is a schematic block diagram of components related to configuration of an application in an Android platform according to an exemplary embodiment of the present invention.

Referring to FIG. 1, in the Android platform, components for configuring a single application may include Activity, Notification, Content Provider, Service, and Broadcast Receiver. Intent exists to call these components.

Activity may be understood as a display screen corresponding to an operation of the application. For example, in case of a phonebook-related application, Activity may be a display screen corresponding to each operation of the phonebook-related application, such as a display screen for displaying a list of phonebook data (e.g., contact information) stored in the phonebook, a display screen for adding new contact information to the phonebook, a display screen for editing previously stored phonebook data, or a display screen for deleting previously stored phonebook data. For example, Activity may be understood as providing an interactive function which displays an operation result of the application according to a user's input.

Service is a component executed in the background. Service is different from Activity which interacts with the user in the sense that Service is executed in the background and thus does not interact with the user. Service provides a function which allows a predetermined application to be continuously executed without a user's input during multitasking of several applications. Therefore, an application which needs to be executed continuously without a user's input should be implemented in Service.

For example, when a user desires to do web surfing while listening to music, during execution of a web-browsing-related application on a foreground, a music-play-related application which needs to be executed continuously is executed continuously in the background through Service, such that the user can do web surfing and listen to music.

Content Provider is a component which allows data to be shared between applications, such that a predetermined application may access data of another application or data in an application (e.g., phonebook data, notes, etc.) may be shared with other applications.

In the Android platform, it is a basic principle that data in a predetermined application is accessible only by that application and is not accessibly by other applications. However, the repetitive storage of data leads to a waste of system resources, and therefore, applications should be able to share data with each other. For this reason, the Android platform allows predetermined data (e.g., media data such as MP3 files) to be accessed by other applications through Content Provider. Through Content Provider, only data desired by an application to be shared can be selectively shared, and the data shared through Content Provider is accessibly by other applications through Content Resolver.

Broadcast Receiver responds to information related to a state of the portable terminal (e.g., information about a remaining battery capacity or a change in a setting of the locale of the portable terminal). Broadcast Receiver may detect an occurrence of an event, and notify the user of the event through Notification. For example, if the battery capacity is insufficient or a network environment changes, Broadcast Receiver may detect such a state and notify the user of the state through Notification.

Notification notifies the user of the occurrence of an event by at least one of turning on or off a Light Emitting Diode (LED), generating vibration, and outputting a ringtone through Notification Manager.

Intent may be understood as a message or a transfer medium which calls the components, Activity, Service, and Broadcast Receiver or transfers data to a corresponding component. For example, Intent activates three components, Activity, Service, and Broadcast Receiver, among the components of the Android application.

Figure 2:
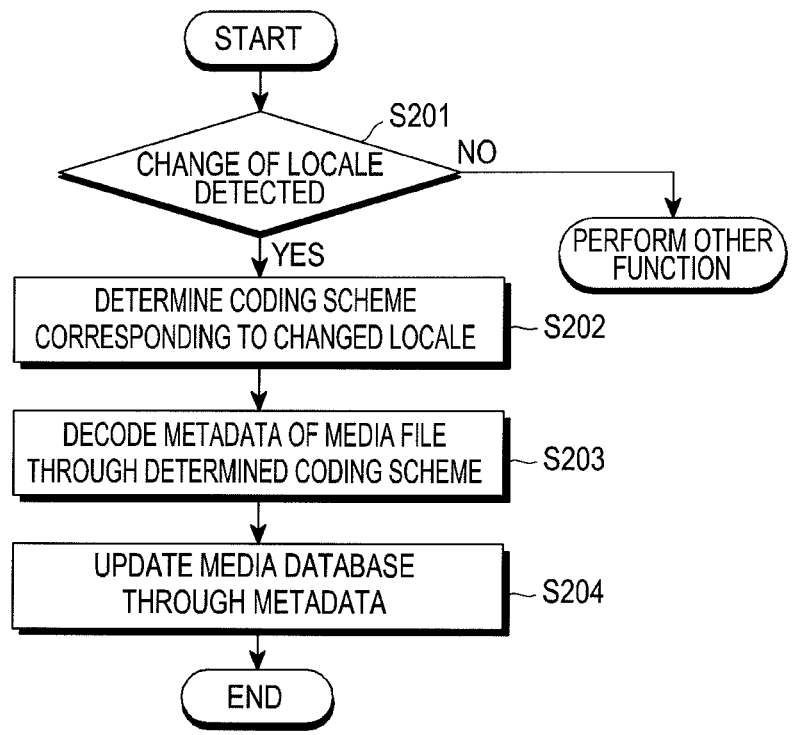
FIG. 2 is a flowchart illustrating a process of updating a media database according to an exemplary embodiment of the present invention.

FIG. 2 is a flowchart illustrating a process of updating a media database according to an exemplary embodiment of the present invention, FIGS. 3A and 3B are exemplary diagrams for describing the process of updating a media database according to an exemplary embodiment of the present invention, and FIG. 4 shows a source code of Broadcast Receiver for updating a media data base according to an exemplary embodiment of the present invention. The process of updating a media database according to an exemplary embodiment of the present invention is described below with respect to FIGS. 2-4.

Referring to FIG. 2, in steps S201 and S202, a change in a locale is detected. The locale denotes a language set for use of the portable terminal (e.g., an Android smart phone). The user may select the locale of the portable terminal appropriately for user's language. For example, when the user sets the locale to Korean, the use environment of the portable terminal including menus and a User Interface (UI) of the portable terminal is displayed in Korean.

The user may select a language the user desires to use among various languages. According to an exemplary embodiment of the present invention, if the locale is changed by the user, a code scheme corresponding to the changed locale is used in subsequent steps. For example, coding schemes EUC, Shift-JIS, etc. are provided for Japanese, coding schemes GB18030, GB2312, HZ, etc. are provided for Chinese, coding schemes ASMO 708, DOS, ISO, etc. are provided for Arabic, and coding schemes general Unicode, UTF-8 Unicode, etc. are provided for Korean.

After steps S201 and S202, it may be determined whether the media database can be updated, and the process may proceed to subsequent steps only when the update of the media database is possible.

In steps S203 and S204, metadata of a media file is decoded using a coding scheme corresponding to the locale; the media database is updated through the decoded metadata.

FIGS. 3A and 3B are exemplary diagrams for describing a process of updating a media database according to the related art and an exemplary embodiment of the present invention, respectively. FIG. 3A shows an example of the related art where, after a media database is updated, display of media data corresponding to a singer Capsule in the media database is requested. FIG. 3B shows an exemplary embodiment of the present invention where, after a media database is updated, display of media data corresponding to Capsule in the media database is requested.

Referring to FIGS. 3A and 3B, in steps S203 and S204, on the assumption that the locale of the portable terminal is changed from Korean to Japanese and metadata coded in Japanese is stored in the portable terminal, according to the related art, the metadata of media data has been coded using a coding scheme corresponding to Korean which is a previous locale prior to the change in the locale and information about the media data (e.g., a name of the singer, a title of a song, etc.) is stored in the media database through the decoded metadata, but the stored information is not updated despite the change in the locale.

According to the related art, if the media database is not updated in spite of the change in the locale, singer name information 310 included in the metadata of corresponding media data (e.g., an MP3 file) may be accurately displayed, but titles of songs coded in Japanese may be displayed indistinguishably as indicated by 320a, 330a, and 340a.

According to an exemplary embodiment of the present invention, if a locale is changed, a coding scheme corresponding to the changed locale is determined, metadata of media data is decoded using the determined coding scheme, and a media database is updated based on the metadata coded using the determined coding scheme (corresponding to the changed locale). As such, when the media database is updated after the locale is changed, information of the media data displayed through the updated media database can be displayed normally.

For example, according to an exemplary embodiment of the present invention, if it is determined that the locale is changed from Korean to Japanese, metadata of a media file is decoded using a coding scheme corresponding to Japanese, and the media file is registered using the decoded metadata in a media database, and the media database is updated accordingly.

If the media database is updated and it is requested to identify media data corresponding to the single name information 310 in the updated media database, titles of songs of three media data (e.g., MP3 files) corresponding to the singer name information 310 are displayed normally as indicated by 320b, 330b, and 340b in FIG. 3B.

Accordingly, in terms of user's accessibility and use efficiency regarding the media data, the information of the media data (e.g., the titles of the songs 320a, 330a, and 340a) displayed in the media database which is not updated according to the related art as shown in FIG. 3A is much different from the information of the media data (e.g., the titles of the songs 320b, 330b, and 340b) displayed in the media database which is updated according to an exemplary embodiment of the present invention as shown in FIG. 3B.

According to an exemplary embodiment of the present invention, it is assumed that the media data includes multimedia data such as a music file (e.g., a .mp3 file, a .mid file, a .wav file, or the like) and a still image or a moving image (e.g., a .jpg file, a .bmp file, an .avi file, an .mkv file, or the like).

When the update of the media database is completed through steps S201 through S204, the user is notified of the completion of the update to recognize that the media database is reestablished to correspond to the changed locale. The update of the media database may be notified to the user through at least one of visual information displayed as a display screen of the display unit, vibration information provided by vibration of the portable terminal, sound information output by a preset sound, AND the like.

When the portable terminal is an Android smart phone using the Android OS, the exemplary embodiment described through steps S201 through S204 may be implemented (executed) through the source code (syntax) shown in FIG. 4. Steps S201 through S204 will be described below with respect to FIG. 4.

FIG. 4 shows a source code of a Broadcast Receiver for updating a media data base according to an exemplary embodiment of the present invention.

Referring to FIG. 4, in the Android platform, MediaProvider registers Broadcast Receiver written in the source code shown in FIG. 4 by calling Register Broadcast Receiver. Thereafter, MediaProvider may recognize through the registered Broadcast Receiver that Intent (Intent.ACTION_LOCALE_CHANGED) is called.

Referring to a syntax part 410, MediaPlayer recognizes through Intent (Intent.ACTION_LOCALE_CHANGED) that the locale of the portable terminal is changed.

Referring to a syntax part 420, after recognizing that the locale is changed, MediaProvider sets an arrangement criterion for the media database to the changed locale and marks the media database such that the media database can be updated during media scanning of media files.

Referring to a syntax part 430, after recognizing that the update of the media database is possible, MediaProvider decodes metadata of media data using a coding scheme corresponding to the changed locale and uses MediaScanner (that is, a MediaScannerService class) to update the media database using the decoded metadata.

MediaProvider updates the media database through Broadcast Receiver written in the source code shown in FIG. 4 and may be understood as one of an implementation form of Content Provider.

As can be seen from the foregoing description, according to an exemplary embodiment of the present invention, the media database is updated after the locale of the portable terminal is changed, thereby normally displaying information of the media data displayed through the updated media database.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for updating one or more media files of a portable terminal, the method comprising:
   a step of detecting a change in a language of the portable terminal, the metadata having not been converted according to a currently used coding scheme;
   a step for checking the coding scheme according to the changed language;
   a step for converting each metadata corresponding to each of one or more media files according to the currently used coding scheme; and
   a step for storing each of the converted metadata in a media database,
   wherein the each metadata corresponding to each of the one or more media files includes information about the corresponding one or more media file.

2. The method of claim 1, further comprising:
   updating the media database by registering the one or more media files corresponding to each of the converted metadata to the media database; and
   if the updating of the media database is completed, notifying a user of the completion of the updating.

3. The method of claim 1, wherein the converting of the each metadata and the storing of the each of the converted metadata are performed by a Broadcast Receiver registered by a MediaProvider of an Android Platform.

4. The method of claim 2, wherein the updating of the media database is performed by a MediaScanner of the Android platform.

5. A portable terminal, comprising:
   at least one memory, one of the at least one memory having a media database stored therein; and
   a controller configured to:
      detect a change in a language of the portable terminal, wherein the metadata has not been converted according to a currently used coding scheme,
      check the coding scheme corresponding to the changed language,
      convert each metadata corresponding to each of one or more media files according to the currently used coding scheme, and
      store each of the converted metadata in the media database,
   wherein the each metadata corresponding to each of the one or more media files includes information about the corresponding one or more media file.

6. The portable terminal of claim 5, wherein,
   the controller updates each of the one or more media files based on each of the converted metadata, updates the media database by registering the one or more media files comprising the converted metadata to the media database, and controls the portable terminal to notify a user that the updating of the media database is complete.

* * * * *